United States Patent [19]

Pickering

[11] Patent Number: 5,687,529
[45] Date of Patent: Nov. 18, 1997

[54] FASTENING DEVICE

[75] Inventor: Richard Pickering, Plymouth, Minn.

[73] Assignee: WorldTec Systems, Inc., Minnetonka, Minn.

[21] Appl. No.: 659,953

[22] Filed: Jun. 7, 1996

[51] Int. Cl.$^6$ ........................................ E04B 2/46
[52] U.S. Cl. ................... 52/582.2; 52/767; 52/698; 52/579; 52/584.1; 52/586.1; 52/769; 403/261; 403/6
[58] Field of Search .................... 52/767, 766, 579, 52/582.2, 584.1, 586.1, 802.11, 800.12, 800.15, 800.16, 800.17, 800.18, 464, 769, 293.3, 271; 403/261, 6, 256, 409.1

[56] References Cited

U.S. PATENT DOCUMENTS

| | | | |
|---|---|---|---|
| 3,217,455 | 11/1965 | Burges | 52/582.2 X |
| 3,225,502 | 12/1965 | Hallauer | 52/769 X |
| 3,307,314 | 3/1967 | Varlonga | 52/769 X |
| 3,392,497 | 7/1968 | Cushman | 52/582.2 X |
| 3,567,260 | 3/1971 | Norris | 52/582.2 X |
| 4,004,855 | 1/1977 | Stecklein | 403/409.1 X |
| 4,881,349 | 11/1989 | Brown et al. | 52/584.1 X |
| 5,065,559 | 11/1991 | Zegel et al. | 52/582.2 X |
| 5,211,497 | 5/1993 | Kraft | 403/6 X |
| 5,398,468 | 3/1995 | Erickson | 52/271 X |

FOREIGN PATENT DOCUMENTS

| | | | |
|---|---|---|---|
| 352263 | 4/1922 | Germany | 52/767 |

Primary Examiner—Carl D. Friedman
Assistant Examiner—W. Glenn Edwards
Attorney, Agent, or Firm—Peterson, Wicks, Nemer & Kamrath, P.A.

[57] ABSTRACT

A fastening device (10) for securing panels (252) to each other, foundations (258) and other surfaces is disclosed including cam elements (50) which are rotated to fasten with locking plates (29). Specifically, elongated hollow channels (11) are provided of an identical construction including slots (24) formed in the free edges of lips (21, 23) defining a slit opening (19). Grooves (22) are formed in the abutting, outside surfaces of the lips (21, 23) for receipt of seals (214). The heads (216) of the seals (214) in an uncompressed condition are of a height substantially greater than and of a width substantially less than the depth and width of a trough (208) of the groove (22) and are compressible to fit completely within the trough (208). The cam elements (50) are rotatably mounted between the support walls (202) of a U-shaped carrier (200). The upper ends of the support walls (202) integrally terminate in shelves (206) having edges which are slideably mounted in the slots (24) of the channels (11). A U-shaped retainer (228) includes a plurality of indentations (242) formed in its support panels (230), with the edges of a locking plate (29) being slideable between the indentations (242) and the inside surface of the central panel (230) of the retainer (228). An aperture (236) is formed in the central panel (230) for providing fastening access of the cam elements (50) to the locking plate (29) slideably mounted therein.

18 Claims, 2 Drawing Sheets

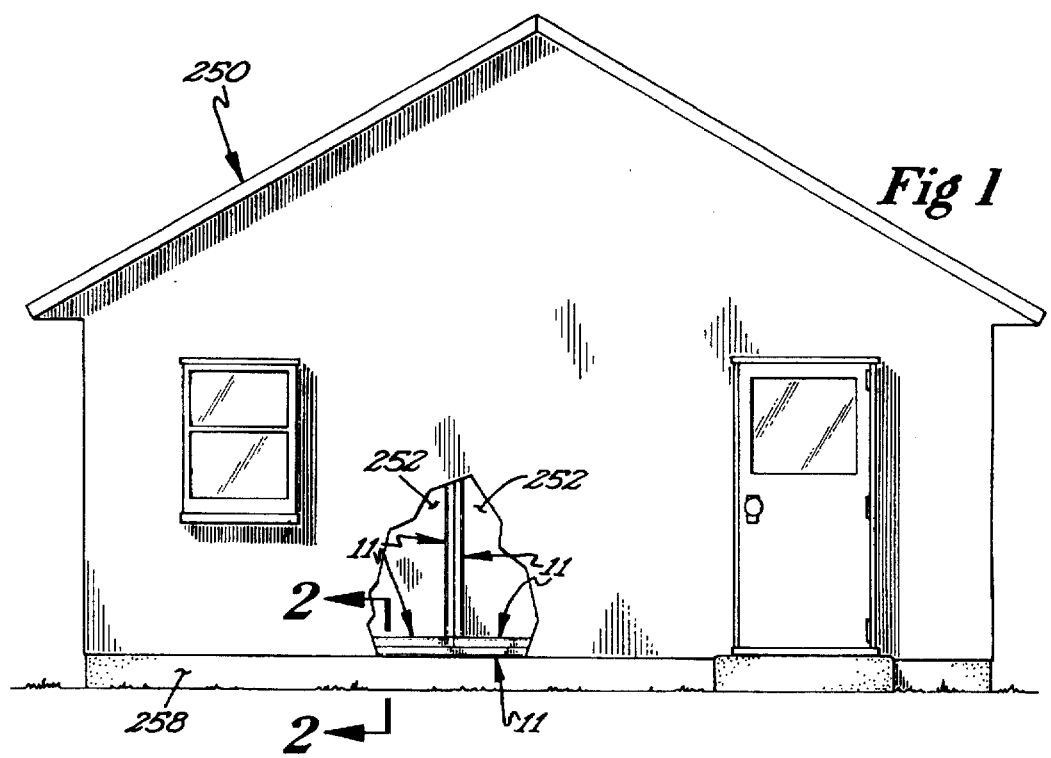
*Fig 1*
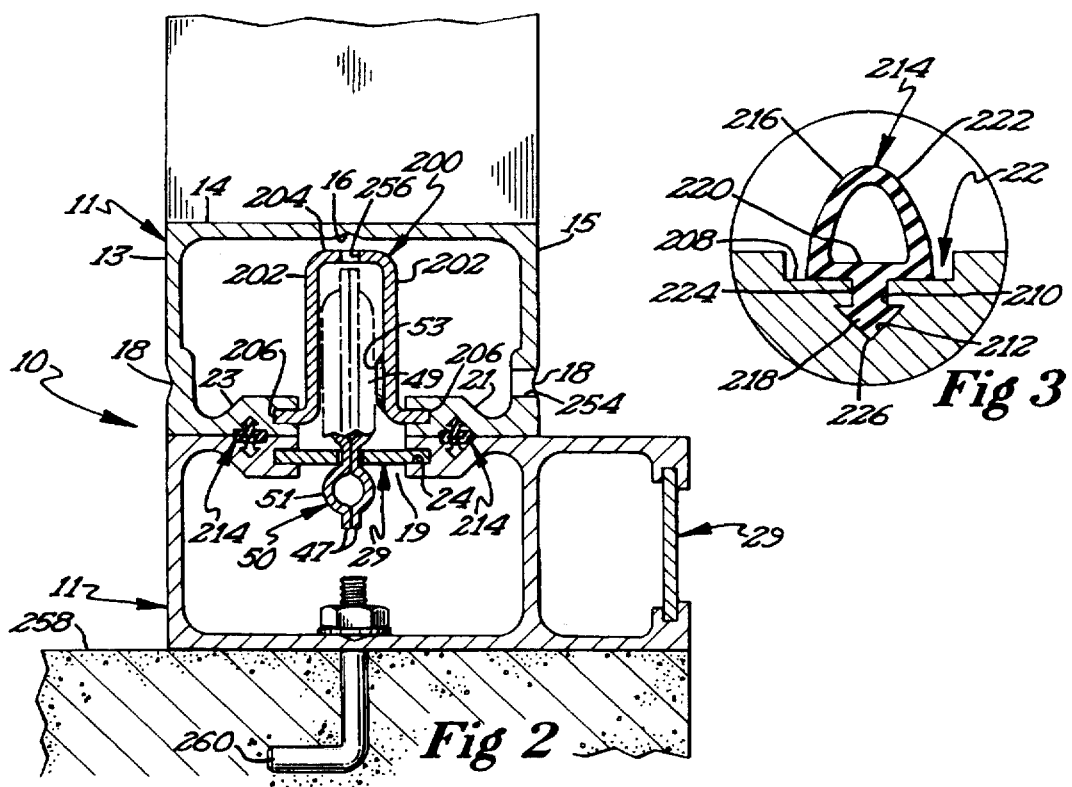
*Fig 2*
*Fig 3*

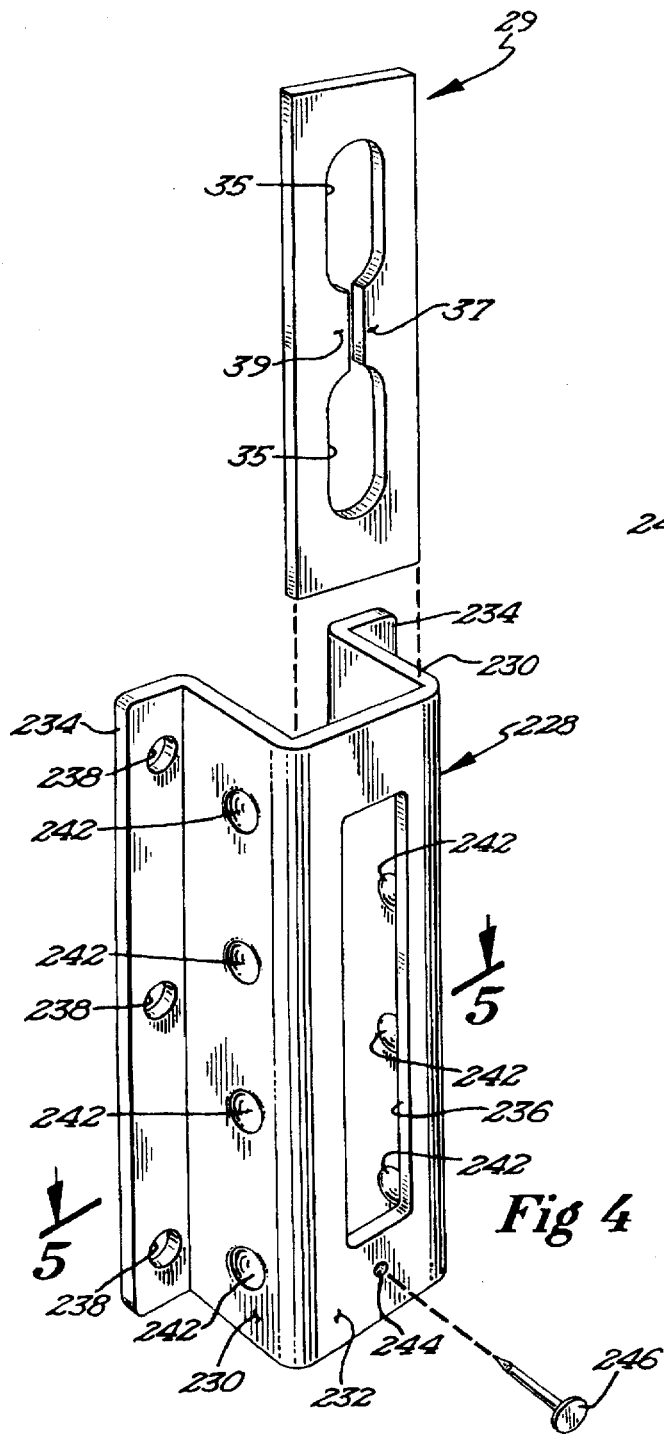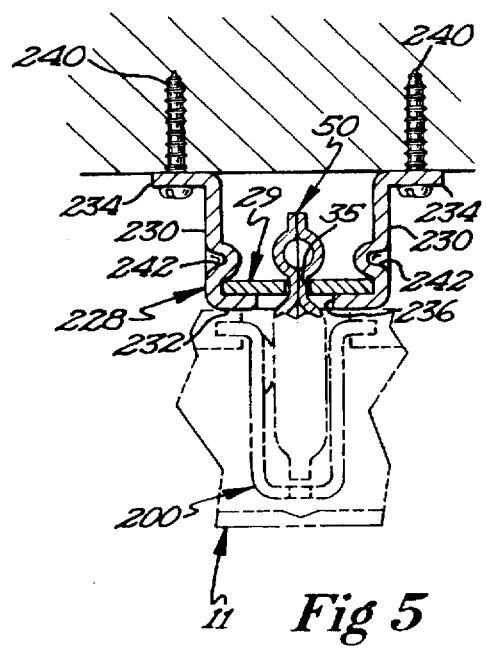

FASTENING DEVICE

BACKGROUND

The present invention generally relates to fastening devices, particularly to fastening devices especially adapted for joining two or more panels or similar partitions together, and specifically to fastening devices formed of standard, easy to fabricate components and which are easily and adjustably assembled and connected.

A popular method for flexible allocation of space within a building utilizes portable partitions. Further, modular building has gained increased acceptance and usage throughout the construction industry. A standard means for connecting various modules consists of a male locking member attached to one module operated to engage a female receiving element attached to another module. See, for example, U.S. Pat. Nos. 3,818,661 and 5,038,538.

Expanding upon the disclosure in regard to FIG. 7 of U.S. Pat. No. 5,038,535, extruded channels including first and second slots parallel to and opening into its slit opening were provided to slideably mount locking plates to allow movement of the locking plates to the desired longitudinal position corresponding to the cam elements and also to allow self alignment of the locking plates with the cam elements. Thus, the use of springs or other appropriate mechanism to accomplish this result as was utilized in the construction of U.S. Pat. No. 3,818,661 was no longer required resulting in a construction having fewer parts and which is easier to fabricate and assemble. Further, the cam elements were extended through the slit opening and located within the extruded channel and were secured by bolts or machine screws extending through the bottom of the mount and the plate of the extruded channel opposite the slit opening. Such securement was relatively difficult because it was necessary to pass the fasteners through the full depth of the recess inside of the mount and required rotation of the half circle plate of the cam element to allow access. Additionally, drilling of the hole through the side of the extruded channel aligned with the tool opening of the cam element was difficult due to the fixed longitudinal position of the mount in the extruded channel. Further, the mounts of the cam elements utilized in the construction of U.S. Pat. Nos. 3,818,661 and 5,038,535 were formed by stamping a flat piece of metal into a tubular shape having one open and one closed end. When the panels were subjected to forces which tended to separate the panels, the upper ends of the support walls between which the cam elements were pivotally mounted tended to separate. This was a major cause of failure of the cam elements disclosed in U.S. Pat. No. 3,818,661 and 5,038,535 as the upper ends of the support walls would separate sufficiently such that the pivots of the cam elements would pull from and be released from the support walls even though the upper ends of the support walls abutted against the free edges of the lips defining the slit opening in the extruded channel. Similarly, the extruded channels as shown in FIG. 7 of U.S. Pat. No. 5,038,538 experienced failure as the result of the slots separating sufficiently to release the locking plate when extreme forces which tended to separate the panels were applied.

Thus, there is a continuing need for improved fastening devices to connect the various modules together and which overcome the deficiencies and disadvantages of prior fastening devices.

SUMMARY

The present invention solves this need and other problems in the field of methods for fastening panels by providing, in the preferred form, a U-shaped carrier having a fastening element mounted between first and second support walls having upper ends terminating in first and second shelves extending in opposite directions and slideably received in first and second slots parallel to and opening into the slit opening of an elongated hollow channel. Thus, forces which tend to pull the fastening element from between the support walls cause the first and second shelves to move apart and into their respective slots. In the most preferred form, the fastening element can be fastened with another fastening element slideably mounted in its own identically constructed, elongated hollow channel.

In a further aspect of the present invention, the channel includes a trough for receiving a head of a seal and a depression extending from the trough for receiving an anchor of the seal. The head of the seal in an uncompressed condition has a height substantially greater than the depth of the trough and a width substantially less than the width of the trough. The head of the seal is compressable to fit completely within the trough. In the most preferred form, abutting channels have aligned troughs but a seal is provided for only one of the channels with the head of the seal extending into the trough of the other channel.

In an additional aspect of the present invention, a U-shaped retainer is provided including a plurality of longitudinally spaced indentations formed in its support panels. A fastening element has opposing edges which are slideable between the inside surface of the retainer central panel and the indentations of the support panels. An aperture is formed in the central panel to provide fastening access to the fastening element.

It is thus an object of the present invention to provide a novel fastening device.

It is further an object of the present invention to provide such a novel fastening device which has reduced tendency to fail by releasing the fastening element or portions thereof when subjected to panel separation forces.

It is further an object of the present invention to provide such a novel fastening device providing a channel of identical construction for slideably mounting either male or female fastening elements.

It is further an object of the present invention to provide such a novel fastening device formed of standard, easy to fabricate components.

It is further an object of the present invention to provide such a novel fastening device which is easily and adjustably assembled and connected.

It is further an object of the present invention to provide such a novel fastening device providing a novel sealing approach between channels.

It is further an object of the present invention to provide such a novel fastening device especially adapted for securement to foundations.

It is further an object of the present invention to provide such a novel fastening device especially adapted for securement to existing wall or similar surfaces.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where:

FIG. 1 shows a front elevational view of a building constructed utilizing fastening devices according to the preferred teachings of the present invention, with portions of the building being broken away to show constructional details.

FIG. 2 shows a partial, cross sectional view of the building of FIG. 1 according to section line 2—2 of FIG. 1.

FIG. 3 shows an enlarged, cross sectional view of a groove including a seal slideably received therein and in its uncompressed condition of a fastening device according to the preferred teachings of the present invention.

FIG. 4 shows an exploded perspective view of a plate retainer and a locking plate of a fastening device according to the preferred teachings of the present invention.

FIG. 5 shows a cross sectional view of the fastening device of FIG. 4 according to section line 5—5 of. FIG. 4.

All figures are drawn for ease of explanation of the basic teachings of the present invention only; the extensions of the Figures with respect to number, position, relationship, and dimensions of the parts to form the preferred embodiment will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in the various figures of the drawings, the same numerals designate the same or similar parts. Furthermore, when the terms "top", "bottom", "first", "second", "inside", "outside", "front", "back", "outer", "inner", "upper", "lower", "height", "width", "length", "end", "side", "horizontal", "vertical", "axial", "radial", "longitudinal", "lateral", and similar terms are used herein, it should be understood that these terms have reference only to the structure shown in the drawings as it would appear to a person viewing the drawings and are utilized only to facilitate describing the illustrative embodiment.

DESCRIPTION

A fastening device according to the preferred teachings of the present invention is shown in the drawings in the preferred form for joining panels and is generally designated 10. In the most preferred embodiments of the present invention, device 10 is an improvement of the type shown and described in U.S. Pat. Nos. 3,818,661 and 5,038,535. For purpose of explanation of the basic teachings of the present invention, the same numerals designate the same or similar parts in the present figures and the figures of U.S. Pat. Nos. 3,818,661 and 5,038,535. The description of the common numerals and device 10 may be found herein and in U.S. Pat. Nos. 3,818,661 and 5,038,535, which are hereby incorporated herein by reference.

Device 10 generally includes an elongated hollow stile or channel 11 which in cross section in the most preferred form is in the shape of a right parallelepiped. In the preferred form, channel 11 is formed by extrusion such as from aluminum, but channel 11 can be formed of fiberglass pultrusions to reduce thermal transmission and improve corrosion resistance. In particular, channels 11 include flat sides 13 and 15 extending along the length of channel 11 and extending in a spaced parallel relation. Sides 13 and 15 are preferably and most conveniently constructed of solid material and are of substantially an equal width. Sides 13 and 15 integrally extend generally perpendicular from the opposite side edges of an inner plate 14 in the most preferred form. A lip 21 is integral to and extends generally perpendicular to the edge of side 15 opposite plate 14. Similarly, a lip 23 is integral to and extends generally perpendicular to the edge of side 13 opposite to plate 14. A slit opening 19 is formed by and defined between the free edges of lips 21 and 23, with the free edges of lips 21 and 23 being in a spaced, parallel relation.

In the most preferred form, the inside surface of plate 14 includes a V-shaped groove 16 extending along the length of channel 11 parallel to slit opening 19 and located intermediate sides 13 and 15 generally corresponding to the location of slit opening 19. The outside surfaces of sides 13 and 15 include V-shaped grooves 18 extending along the length of channel 11 parallel to slit opening 19 and plate 14. Further, the outer surfaces of lips 21 and 23 each include grooves 22 of a generally T-shape and extending along the length of channel 11 parallel to and on opposite sides of slit opening 19.

According to the teachings of the present invention, the free edges of lips 21 and 23 each include a slot 24 extending along the length of channel 11 parallel to the outer surfaces of lips 21 and 23 and parallel to and opening into slit opening 19. In the most preferred form, slots 24 are in the shape of a right parallelepiped and are integrally formed in lips 21 and 23. To insure that sufficient material exists between slots 24 and the outer and inner surfaces of lips 21 and 23, lips 21 and 23 can have increased thickness greater than the thickness of sides 13 and 15 and plate 14, with the increased thickness extending from the free edges of lips 21 and 23 towards sides 13 and 15 a partial distance as shown or the entire distance. Additionally, the configuration and size of channel 11 as shown and described tend to reduce the possibility of slots 24 separating when extreme forces which tend to separate fastening device 10 are applied.

Device 10 further generally includes a locking plate 29 held within and freely movable along the length of channel 11. Locking plate 29 includes an opening 35 therein which serves as a female latching member. Opening 35 is an elongated one having a pair of projections 37 and 39 extending inwardly at a position about midway along its length. Projections 37 and 39 do not extend completely across opening 35 in order to properly mate with existing rotating cam male latching elements 50. Of course, other specific latching mechanisms may be provided on locking plate 29 in place of opening 35, but the arrangement shown has the advantage that locking plate 29 may be constructed out of a flat piece of sheet metal by a simple punching operation. Locking plate 29 remains a planar element.

According to the teachings of the present invention, the side edges extending along the length of locking plate 29 are parallel and spaced a distance greater than the spacing between the free edges of lips 21 and 23 but less than the spacing between the surfaces of slots 24 of lips 21 and 23 parallel to sides 13 and 15. Further, the thickness of locking plate 29 between its inner and outer surfaces is generally equal to but slightly less than the width direction of slots 24 parallel to sides 13 and 15. Thus, the side edges of locking plate 29 are slideably received in and between slots 24 of lips 21 and 23 for slideable movement in slit opening 19 of channel 11. The frictional forces between locking plate 29 and slots 24 should be sufficient to hold locking plate 29 from sliding in slots 24 under the influence of gravity and dynamic forces created by moving channels 11 but not of a sufficient strength as to prevent movement of locking plate 29 along the length of channel 11 by hand or by operation of fastening device 10.

Locking plate 29 of the most preferred form is designed to be used with existing male fastening elements 50 such as of the cam type shown in the drawings. Such existing fastening element 50 of the preferred form generally includes a half-circle plate 47 that is rotatable about a tool opening 49. Half-circle plate 47 includes a flange 51 which extends on either side of plate 47.

According to the teachings of the present invention, device 10 includes a carrier 200 for slideably mounting fastening elements 50 to channel 11. Carrier 200 has generally U-shaped cross sections and generally includes first and second support walls 202 having their lower ends integrally extending from the opposite sides of a central wall 204. The upper ends of support walls 202 integrally terminate in shelves 206 extending in opposite directions from each other. In the most preferred form, carrier 200 is formed from a sheet of metal which is cut and then bent into the form illustrated. The upper ends of support walls 202 and also shelves 206 are not connected together and are spaced from each other in the preferred form. In the most preferred form, walls 202 and 204 and shelves 206 are generally planar between their interconnections to each other. Fastening element 50 is rotatably mounted between support walls 202 by extending the axle 49 of fastening element 50 which includes tool opening through openings 53 formed in support walls 202. The distance between the upper surfaces of shelves 206 and the lower surface of central wall 204 is generally equal to the distance between the upper surfaces of slots 24 and the upper surface of plate 14 in the most preferred form.

According to the teachings of the present invention, the side, free edges of shelves 206 extending along the length of carrier 200 are parallel and spaced a distance greater than the spacing between the free edges of lips 21 and 23 but less than the spacing between the surfaces of slots 24 of lips 21 and 23 parallel to sides 13 and 15. Further, the thickness of shelves 206 between its inner and outer surfaces is generally equal to but slightly less than the width direction of slots 24 parallel to sides 13 and 15. Thus, the free side edges of shelves 206 are slideably received in and between slots 24 of lips 21 and 23 for slideable movement in slit opening 19 of channel 11. With shelves 206 slideably received in slots 24, support walls 202 extend into hollow channel 11. The frictional forces between shelves 206 and slots 24 should be sufficient to hold carrier 200 from sliding in slots 24 under the influence of gravity and dynamic forces created by moving channels 11 but not of a sufficient strength as to prevent movement of carrier 200 along the length of channel 11 by hand or by operation of fastening device 10.

As best seen in FIG. 3, grooves 22 in the most preferred form include a longitudinally extending trough 208 of a generally right parallelogram shape in the most preferred form extending from the outer surfaces of lips 21 and 23 of channel 11. A longitudinally extending slot 210 of a generally parallelogram shape of a width considerably less than the width of trough 208 extends from the planar lower surface of trough 208 generally intermediate the sides of trough 208. An enlarged channel 212 extends from slot 210 and has portions of a width greater than slot 210 and in the most preferred form considerably less than the width of trough 208. In the most preferred form, channel 212 has cross sections of a generally arrow or V shape. However, it can be appreciated that channel 212 can have other shapes than as shown and described.

Device 10 according to the teachings of the present invention further includes longitudinally extending seals 214 which in the most preferred form are formed of homogeneous material. In particular, seal 214 includes a head 216 and an anchor 218. In the most preferred form, head 216 is tubular in form having generally U-shaped cross sections in an uncompressed condition. Specifically, head 216 includes a planar portion 220 of a width less than the width of trough 208 and a thickness less than the depth of trough 208. Head 216 further includes an arcuate portion 222 having opposite edges integrally extending from the side edges of planar portion 220. In an uncompressed condition, head 216 of seal 214 has a width substantially less than the width of groove 208. Further, in an uncompressed condition, arcuate portion 222 and head 216 have a height substantially greater than trough 208 and extend outside of trough 208 and beyond the outer surfaces of lips 21 and 23 of channel 11. However, in the most preferred form, head 216 can be compressed to fit completely within and be located totally within the confines of trough 208 and within the plane of the outer surfaces of lips 21 and 23 of channel 11. Anchor 218 is of a shape complementary to and for longitudinal slideable receipt in slot 210 and channel 212. In particular, anchor 218 extends from planar portion 220 and includes a leg portion 224 of a size and shape corresponding to and for slideable receipt in slot 210 and a head portion 226 of a size and shape corresponding to and for slideable receipt in channel 212. Thus, it should be appreciated that slot 210 and channel 212 define a depression extending from trough 208 for receipt of anchor 218 of seal 214 for holding seal 214 relative to channel 11, with anchor 218 being longitudinally slideably received in the most preferred form. Seals 214 are held in grooves 22 with planar portion 220 of head 216 abutting with the planar lower surface of trough 208.

In the most preferred form, seals 214 are provided on lips 21 and 23 of only one of the abutting channels 11 when it is desired to secure two panels or partitions 252 together such as channel 11 including carriers 200 as shown in FIG. 2. Grooves 22 of the other of the abutting channels 11 do not include seals 14 with arcuate portions 222 of seals 214 of the abutting channel 11 extending into and being compressed against troughs 208 of the other channel 11 not including seals 214.

Device 10 according to the preferred teachings of the present invention further includes a plate retainer 228 for joining a panel to an existing surface such as an existing wall, floor, or ceiling and whether or not such surface is constructed utilizing device 10 of the present invention. In particular, retainer 228 has generally U-shaped cross sections and generally includes first and second support panels 230 having their lower ends integrally extending from the opposite sides of a central panel 232. The upper ends of support panels 230 integrally terminate in feet 234 extending in opposite directions from each other, with the upper surfaces of feet 234 lying in a common plane. In the most preferred form, panels 230 and 232 and feet 234 and their respective inside and outside surfaces are generally planar between their interconnections to each other. In the embodiment shown, the upper and lower ends of support panels 230 are parallel and the height of support panels 230 or in other words the spacing between the upper and lower ends of support panels 230 is equal such that panel 232 is located generally parallel to the upper surfaces of feet 234 and thus to the surface to which it is desired to join a construction partition or panel 252. However, support panels 230 can have different heights such that central panel 232 is not parallel to the upper surfaces of feet 234 and thus to the surface to which it is desired to join construction panel 252. Central panel 232 includes an aperture 238 of a size at least equal to and preferably larger than opening 35 of locking plate 29 and for providing fastening access to locking plate 29 by cam element 50. Feet 238 include a plurality of longitudinally spaced apertures 238 for receipt of suitable fasteners 240 such as screws as shown which secure feet 238 and thus retainer 228 to the surface to which it is desired to join construction panel 252. Each support panel 230 includes a plurality of longitudinally spaced indentations 242 extending inward of the inside surfaces of support panels 230. Central panel 232 in the most preferred form further includes a small opening 244 for slideably receiving a nail or similar elongated rod. In the most preferred form, retainer 228 is formed from a sheet of metal which is cut, stamped and then bent into the form illustrated.

The spacing between support panels 230 adjacent to central panel 232 is generally equal to and for slideably receiving locking plate 29 therebetween. Indentations 242 are equally spaced from central panel 232 a distance generally equal to the thickness of locking plate 29 and specifically for slideably receiving locking plate 29 therebetween. Thus, the upper or inner surface of central panel 232, the inner surfaces of support panels 230 and the portions of indentation 242 adjacent central panel 232 form and define slide slots for the side edges of locking plate 29 in a similar manner as slots 24 of channels 11. When positioned in retainer 228, opening 35 of locking plate 29 should be positioned within aperture 236. The frictional forces between locking plate 29 and retainer 228 should be sufficient to hold locking plate 29 from sliding in retainer 228 under the influence of gravity and dynamic forces created by moving retainer 228 but not of a sufficient strength as to prevent movement of locking plate 29 in retainer 228 by hand or by operation of fastening device 10. In the event the tolerances in the manufacture of retainer 228 are such that the frictional forces are insufficient to hold locking plate 29 from sliding in retainer 228, a nail or similar elongated rod 246 can be inserted in opening 244 and retainer 228 positioned on the surface with opening 244 located in a vertical position below aperture 236 to prevent locking plate 29 from sliding through retainer 228.

Now that the basic construction of device 10 according to the preferred teachings of the present invention has been set forth, the operation and some of the advantages of device 10 can be explained in connection with a building construction such as of a house as generally shown in FIG. 1. Specifically, a plurality of construction panels 252 are preferably prefabricated off site for fastening together on site. Generally, each panel 252 includes suitable insulation, underlayments, and suitable coverings as desired such as drywall on interior surfaces and such as siding on exterior surfaces. Panels 252 further can include windows, doors and the like prefabricated therewith. Each peripheral edge of panel 252 includes a channel 11 according to the teachings of the present invention. It should be appreciated that channels 11 can be set at a nonparallel angle to the plane of panels 252 where the planes of panels 252 are not at angles of 90° or 180°. As an example, panels 252 forming the side walls of building 250 and extending perpendicular to the front shown in FIG. 1 could have channels 11 in their upper edges set at an angle corresponding to the pitch of panels 252 forming the roof of building 250 such that lips 21 and 23 of the channels 11 in the upper edges of the sidewalls abut with lips 21 and 23 of the channels 11 in the lower surface of the roof of building 250. Likewise, panels 252 forming the roof of building 250 could have channels 11 in the peak edges such that openings 19 are vertically orientated.

In any case, during the fabrication of panels 252, channels 11 can be with either side 13 or 15 facing outward or inward and without concern whether channel 11 will receive locking plates 29 or carriers 200. After panel 252 has been substantially completely fabricated, it can then be determined which of the channels 11 of panel 252 receive locking plates 29 and which will receive carriers 200, with locking plates 29 and carriers 200 being slid in slots 24 and positioned where desired. When carriers 200 are located generally where they are desired, a hole 254 can be drilled through side 15, with such drilling being preferably performed where panels 252 are being constructed. In this regard, groove 18 is provided of a size and configuration to act as a centering aid for the drill bit in drilling hole 254 such that hole 254 is located at the correct height on side 15, to be aligned with the tool opening of axle 49 of cam element 50 rotatably mounted in carrier 200. It can be appreciated that if hole 254 is not longitudinally aligned with the tool opening, carrier 200 can be slid in slots 24 until they are aligned. Thus, fabrication can be performed rapidly with relatively loose tolerances. Although the fastening force when device 10 is engaged typically will prevent carriers 200 from undesirably sliding in slots 24, carriers 200 can be secured to channel 11 such as by self tapping screws extending through apertures 254 formed in central wall 204 on opposite sides of cam elements 50 and threaded into inner plate 14. In this regard, groove 16 is provided of a size and configuration to act as a centering aid for the screw or for the drill bit for drilling a starter hole for the screw into inner plate 14. Also, seals 214 are slid in grooves 22 of the desired channels 11 of panel 252.

Likewise, channels 11 can be attached to surfaces where it is desired to secure panel 252 including fastening device 10 of the present invention. As an example, channel 11 can be suitably secured to the upper surface of a suitable foundation 258 such as a concrete or block wall, a concrete slab, or the like. In the most preferred form, channel 11 is secured by anchor bolts 260 embedded in foundation 258 and extending through holes drilled in inner plate 14. In this regard, groove 16 is provided of a size and configuration to act as a centering aid for the drill bit in drilling the holes through which anchor bolts 260 extend. Channels 11 secured to foundation 258 can include locking plates 29 as shown in FIG. 2 or carriers 200, as desired, with locking plates 29 or carriers 200 being received in slots 24 of channel 11 either before or after channel 11 is secured to foundation 258.

To secure panel 252 to channel 11 secured to foundation 258, locking plates 29 are positioned in slots 24 generally corresponding to carriers 200. Panel 252 is then placed on channel 11 of foundation 258 such that panel 252 is aligned with channel 11 of foundation 258. At that time, a suitable tool can be extended through hole 254 and into the tool opening of cam elements 50 to thereby rotate half-circle plate 47 and flange 51 into openings 35 of locking plates 29. It should be realized that due to the slideable mounting of carriers 200 and/or locking plates 29 in slots 24 of channels 11, locking plate 29 will be adjustably positioned relative to cam element 50 such that locking plate 29 will self align with cam element 50 so that the inner circumferential surfaces of flanges 51 contact projections 37 and 39 of locking plate 29. Thereby, locking plate 29 is urged against the upper surfaces of slots 24 resulting in a firm grip of the portions of lips 21 and 23 intermediate locking plate 29 of channel 11 secured to foundation 258 and the outside surfaces of lips 21 and 23 of channel 11 of panel 252. The result is a firm engagement which prevents panel 252 from separating from channel 11 secured to foundation 258 when subjected to outside forces including but not limited to gravity.

It should be noted that as panel 252 is placed on channel 11 secured to foundation 258 and fastened thereto by device 10 of the present invention, seals 214 provide an air and moisture barrier between channels 11 secured to foundation 258 and of panel 252. Specifically, in the most preferred form, arcuate portions 222 of heads 216 of seals 214 of panel 252 extend into, engage with, and are compressed against the planar lower surface of troughs 208 of grooves 22 of channel 11 secured to foundation 258. It can be appreciated that in the most preferred form, air flow between abutting lips 21 and 23 and past seals 214 can not occur in a single plane but rather must move around arcuate portions out of the plane between the outside surfaces of lips 21 and 23 and thus results in a tortious path. Such a tortious path minimizes air flow and provides a better sealing relation. However, it should be noted that even if seals 214 are not aligned with grooves 22 of an abutting channel 11, seals 214 can be compressed completely within troughs 208 of grooves 22 in which they are slideably received. Thus, seals 214 will not prevent the flush abutment of the outside surfaces of lips 21 and 23 including seals 214 with an external surface to which channel 11 is desired to be fastened.

Additionally, carrier 200 of the present invention allows the use of identically fabricated channels 11 for adjustably securing cam elements 50 in place. Specifically, carrier 200 allows cam elements 50 to be slideably mounted in channels 11 which alternatively can receive locking plates 29. Thus, fastening device 10 according to the preferred teachings of the present invention makes assembly easier and less expensive.

Further, it should be noted that forces which would tend to separate panel 252 from channel 11 secured to foundation 258 has a tendency to cause the lower ends of support walls 202 which pivotably mount plate 47 to pivot about central wall 204 such that the upper ends of support walls 202 would separate. However, such tendency of the upper ends of support walls 202 to separate results in the side edges of shelves 206 engaging the surfaces of slots 24 parallel to sides 13 and 15 of channels 11 and thereby preventing further separation. Therefore, carrier 200 of the present invention is not as prone to failure of cam elements 50 than was the construction of U.S. Pat. Nos. 3,818,661 and 5,038,535.

Although the operation of fastening device 10 has been explained for securing channel 11 of panel 252 to channel 11 secured to foundation 258 as shown in FIGS. 1 and 2, the operation of fastening device 10 is substantially the same for securing channel 11 of a first panel 252 to channel 11 of another panel 252 as also shown in FIG. 1. Specifically, rather than being secured to foundation 258, channel 11 is secured to panel 252 such that rather than fastening panel 252 to foundation 258, fastening device 10 fastens two panels 252 together.

Further, occasions arise where panels 252 are desired to be fastened to a surface where channel 11 is not desired to be utilized such as where anchor bolts 260 are not available. One example would be where it is desired to divide an existing space into two or more compartments such as by extending a wall formed by panels extending between first and second outer walls and the floor and ceiling of the existing space. Additionally, such outer walls, floor, and ceiling may or may not be constructed from panels 252 according to the teachings of the present invention. In particular, plate retainers 228 are secured at locations generally corresponding to the locations of carriers 200 such as by extending fasteners 240 through apertures 238 in feet 234 and into the outer walls, floor, or ceiling. Panels 252 can then be positioned in place and cam elements 50 rotated to engage locking plates 29. It should be realized that due to the slideable mounting of carriers 200 in slots 24 of channels 11 and/or of locking plates 29 in plate retainers 228, locking plate 29 will be adjustably positioned relative to cam element 50 such that locking plate 29 will self align with cam element 50 so that the inner circumferential surfaces of flanges 51 contact projections 37 and 39 of locking plate 29. Thereby, locking plate 29 is urged against the inside surface of central panel 232 of plate retainer 228 resulting in a firm grip of central panel 232 intermediate locking plate 29 and the outside surfaces of lips 21 and 23 of channel 11 including carrier 200 and cam element 50. The result is a firm engagement which prevents channel 11 from separating from plate retainer 228 when subjected to outside forces including but not limited to gravity.

It should be appreciated that channels 11 according to the teachings of the present invention can be secured together in any desired arrangements and can include wedges or similar devices to obtain desired orientations. Channels 11 can be secured together mechanically such as through the use of fasteners, welding, or the like or can be fabricated as an integral unit as shown in FIG. 2. The arrangement and orientation as shown in FIG. 2 would be useful in securing vertical and horizontal panels 252 together such as forming an outer wall and a floor extending over a basement or crawl space for building 250.

It should also be appreciated that fastening device 10, according to the teachings of the present invention, can utilize other types and forms of fastening elements than as shown. As an example, the male fastening element could be in the form of a rotatable finger or hook, and locking plate 29 could include projections 37 and 39 extending completely across and dividing opening 35 and providing a cam lock-type action with the rotatable finger or hook.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

I claim:

1. Fastening device comprising, in combination: a first elongated hollow channel having an elongated slit opening formed and defined by first and second free edges, with the first and second free edges including first and second slots parallel to and opening into the slit opening; a carrier having generally U-shaped cross sections, with the carrier including first and second support walls having upper ends terminating in first and second shelves extending in opposite directions, with the first shelf being slideable in the first slot and the second shelf being slideable in the second slot, with the first and second support walls extending into the hollow channel; and a first fastening element mounted between the first and second support walls with forces tending to pull the fastening element from between the first and second support walls causing the upper ends of the support walls to separate and move the first and second shelves apart and into their respective slots.

2. The fastening device of claim 1 wherein the first fastening element is rotatably mounted between the first and second support walls.

3. The fastening device of claim 2 wherein the first fastening element is a rotating male cam including a half-circle plate having a flange extending from at least one side of the half-circle plate.

4. The fastening device of claim 2 wherein the channel includes first and second sides having outside surfaces, with a groove formed in the outside surface of at least one of the first and second sides, with the fastening element including a tool opening, with the groove being of a size and configuration to act as a centering aid in drilling a hole in the side for alignment with the tool opening of the fastening element.

5. The fastening device of claim 1 wherein the upper ends of the first and second support walls and the first and second shelves are not connected together and are spaced from each other.

6. The fastening device of claim 1 wherein the channel includes an inner plate having an inside surface, with a groove formed in the inside surface of the inner plate and extending parallel to but spaced from the slit opening, with the groove being of a size and configuration to act as a centering aid in drilling a hole in the inner plate.

7. The fastening device of claim 6 wherein the first and second support walls include lower ends integrally extending from the opposite sides of a central wall, with the central wall including at least a first aperture for securing the central wall to the inner plate.

8. The fastening device of claim 1 further comprising, in combination: a second elongated hollow channel of an identical construction as the first elongated hollow channel, with the first fastening element of the carrier being of the male type; and a female fastening element slideably received in the first and second slots of the second elongated hollow channel.

9. The fastening device of claim 8 further comprising, in combination: a seal including a head and an anchor, with the head in an uncompressed condition having a width and a height, with the channels including at least a first trough formed on an abutting surface having a width substantially greater than the width of the head in the uncompressed condition and a depth substantially less than the height of the head in the uncompressed condition, with the channels further including a depression extending from the trough for receipt of the anchor of the seal for holding the seal relative to the channel, with the head being compressable to fit completely within the trough.

10. The fastening device of claim 9 wherein the channels include a second trough located on opposite sides of the slit opening than the first trough, with seals being provided in the troughs in only one of the first and second channels, with the first and second troughs of the first and second channels being aligned when the fastening elements are engaged, with the seals of one of the first and second channels extending into the troughs of the other of the first and second channels.

11. The fastening device of claim 1 further comprising, in combination: a retainer, with the retainer having generally U-shaped cross sections and generally including first and second support panels having lower ends and upper ends, a central panel, and means for securing the upper ends of the support panels to a surface, with the lower ends extending from the opposite sides of the central panel, with the support and central panels each having an inside surface, with each support panel including a plurality of longitudinally spaced indentations extending inward of the inside surface, with each of the plurality of longitudinally spaced indentations being spaced from the inside surface of the central panel the same distance; and a second fastening element having first and second edges, with the first edge of the second fastening element being longitudinally slideable between the inside surface of the central panel and the indentations of the first support panel and the second edge of the second fastening element being longitudinally slideable between the inside surface of the central panel and the indentations of the second support panel, with the central panel including an aperture providing fastening access between the first and second fastening elements.

12. Retainer for a fastening element having first and second edges comprising, in combination: first and second support panels having lower ends and upper ends; a central panel; and means for securing the upper ends of the support panels to a surface, with the lower ends extending from the opposite sides of the central panel, with the support panels and the central panel being generally U-shaped, with the support and central panels each having an inside surface, with each support panel including a plurality of longitudinally spaced indentations extending inward of the inside surface, with each of the plurality of longitudinally spaced indentations being spaced from the inside surface of the central panel the same distance, with the first edge of the fastening element being longitudinally slideable between the inside surface of the central panel and the indentations of the first support panel and the second edge of the fastening element being longitudinally slideable between the inside surface of the central panel and the indentations of the second support panel, with the central panel including an aperture providing fastening access to the fastening element.

13. The retainer of claim 12 wherein the lower and upper ends of the first and second support panels are parallel and the spacing between the lower and upper ends of the first support panel is equal to the spacing between the lower and upper ends of the second support panel.

14. The retainer of claim 12 wherein the securing means comprises feet integrally extending from the upper ends of the support panels.

15. The retainer of claim 12 wherein the inside surface of the central panel is generally planar and the fastening element is a planar element.

16. Construction comprising, in combination: a seal including a head and an anchor, with the head in an uncompressed condition having a width and a height; a first channel including at least a first trough formed on an abutting surface, with the trough having a width substantially greater than the width of the head in the uncompressed condition and a depth substantially less than the height of the head in the uncompressed condition, with the channel further including a depression extending from the trough for receipt of the anchor of the seal for holding the seal relative to the channel, with the head being compressable to fit completely within the trough.

17. The construction of claim 16 further comprising, in combination: a second channel including a second trough, with the seal being provided in the trough in only the first channel, with the first and second troughs of the first and second channels being aligned, with the seal of the first channel extending into the trough of the second channel.

18. The construction of claim 16 wherein the head is tubular in form and includes a planar portion, with the anchor extending from the planar portion, with the trough including a planar lower surface, with the depression extending from the lower surface of the trough, with the planar portion of the head abutting with the lower surface of the trough.

* * * * *